United States Patent [19]

Kensington et al.

[11] Patent Number: 4,473,212
[45] Date of Patent: Sep. 25, 1984

[54] BLAST GATE

[75] Inventors: Kenneth L. Kensington; William H. Burghdoff; Dale L. Keeler, all of Hastings, Mich.

[73] Assignee: Hastings Reinforced Plastics, Inc., Hastings, Mich.

[21] Appl. No.: 534,673

[22] Filed: Sep. 22, 1983

[51] Int. Cl.³ ............................................. F16K 51/00
[52] U.S. Cl. .................................. 251/152; 126/285 R
[58] Field of Search ............... 251/152, 228, 231, 235, 251/298, 304; 126/285 R, 286, 289, 291, 292

[56] References Cited

U.S. PATENT DOCUMENTS

| | | | |
|---|---|---|---|
| 198,501 | 12/1877 | Volkman | 251/152 |
| 417,670 | 12/1889 | Elliott | 126/285 R |
| 727,971 | 5/1903 | King | 126/285 R |
| 771,860 | 10/1904 | Croswell | 126/285 R |
| 846,542 | 3/1907 | Albertson | 126/285 R |
| 1,000,304 | 8/1911 | Sliger | 126/285 R |
| 1,282,811 | 10/1918 | Goldburg | 126/285 R |
| 1,470,425 | 10/1923 | Curtis | 126/285 R |
| 1,813,273 | 7/1931 | Bovey | 251/152 |
| 2,117,787 | 5/1938 | Bock | 126/285 R |
| 3,199,832 | 8/1965 | Calamia | 251/152 |

*Primary Examiner*—Daniel J. O'Connor
*Attorney, Agent, or Firm*—Price, Heneveld, Huizenga & Cooper

[57] ABSTRACT

A wafer damper assembly formed of a thin, flat, polymeric annulus with a central opening receiving a polymeric wafer baffle. The baffle has a non-circular transverse passage receiving a cooperative shaft pivoted in the flat annulus, with a lockable quadrant handle on one end of this shaft.

2 Claims, 2 Drawing Figures

BLAST GATE

BACKGROUND OF THE INVENTION

This invention relates to duct valving, especially for gases in a ventilation system, and more particularly to a wafer damper assembly.

Ventilation ducting as for fume ducts and pipelines installed in chemical processing facilities or the like, frequently requires valving or so-called blast gates which are flow control devices. Installation of such flow control valves normally involves substantial modification of the duct work by skilled craftsmen to install a damper or valve. This is expensive. And, the valves are relatively large and costly.

SUMMARY OF THE INVENTION

An object of this invention is to provide a novel wafer baffle assembly enabling insertion thereof at duct joints in simple fashion, requiring no special skill, no holes to be formed in the duct, and no special shaping of the duct. The wafer baffle assembly is thin and flat, readily capable of being slidably inserted into the joint. The wafer baffle assembly is moreover readily removable or replaceable. Its thinness enables the duct joint to be bolted together after removal of the baffle assembly for servicing of the latter, thereby preventing disruption of the process equipment. It is relatively inexpensive, with all components being replaceable if necessary, yet comprising a unitary structure. Such assembly is formed of a polymeric annulus, a polymeric wafer baffle therein having a transverse diametral passage of non-circular cross section receiving a shaft of non-circular cross section. An end of the shaft extends through the annulus to connect to a quadrant handle having an arcuate lock slot through which releaseable fastener means protrudes.

These and other objects, advantages, and features of the novel assembly will be apparent from a study of the following specification in conjunction with the drawings.

DESCRIPTION OF THE PREFERRED EMBODIMENT

Figure 1:
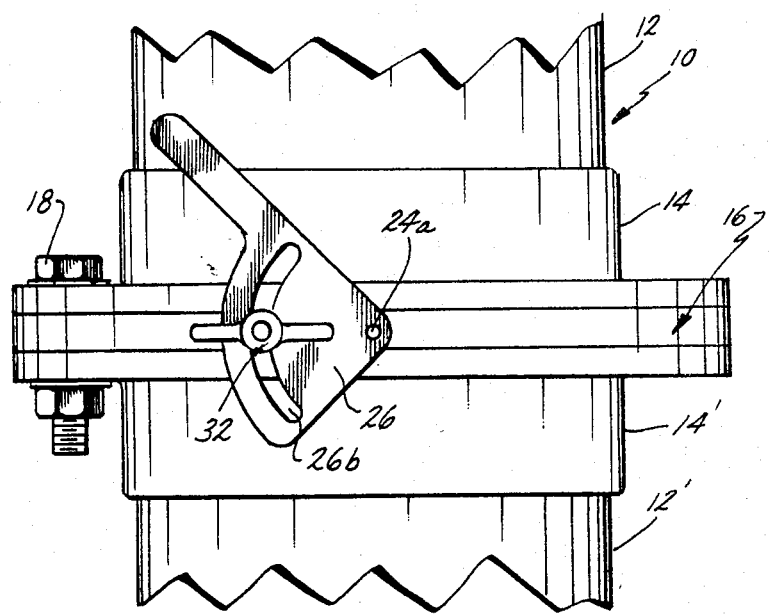
FIG. 1 is a side elevational view of a duct containing the novel wafer damper assembly.

Referring now specifically to FIG. 1, the entire assembly 10 there depicted includes a duct or pipe 12 having a connector flange coupling 14 on one end thereof, a cooperative duct or pipe 12' having a connector flange coupling 14' on an end thereof, with the novel wafer damper assembly 16 sandwiched between the flange connectors 14 and 14'. The two flange connectors and wafer damper assembly are shown, for illustrative purposes, to be secured together by bolts 18, although other types of fastening could be employed.

Figure 2:
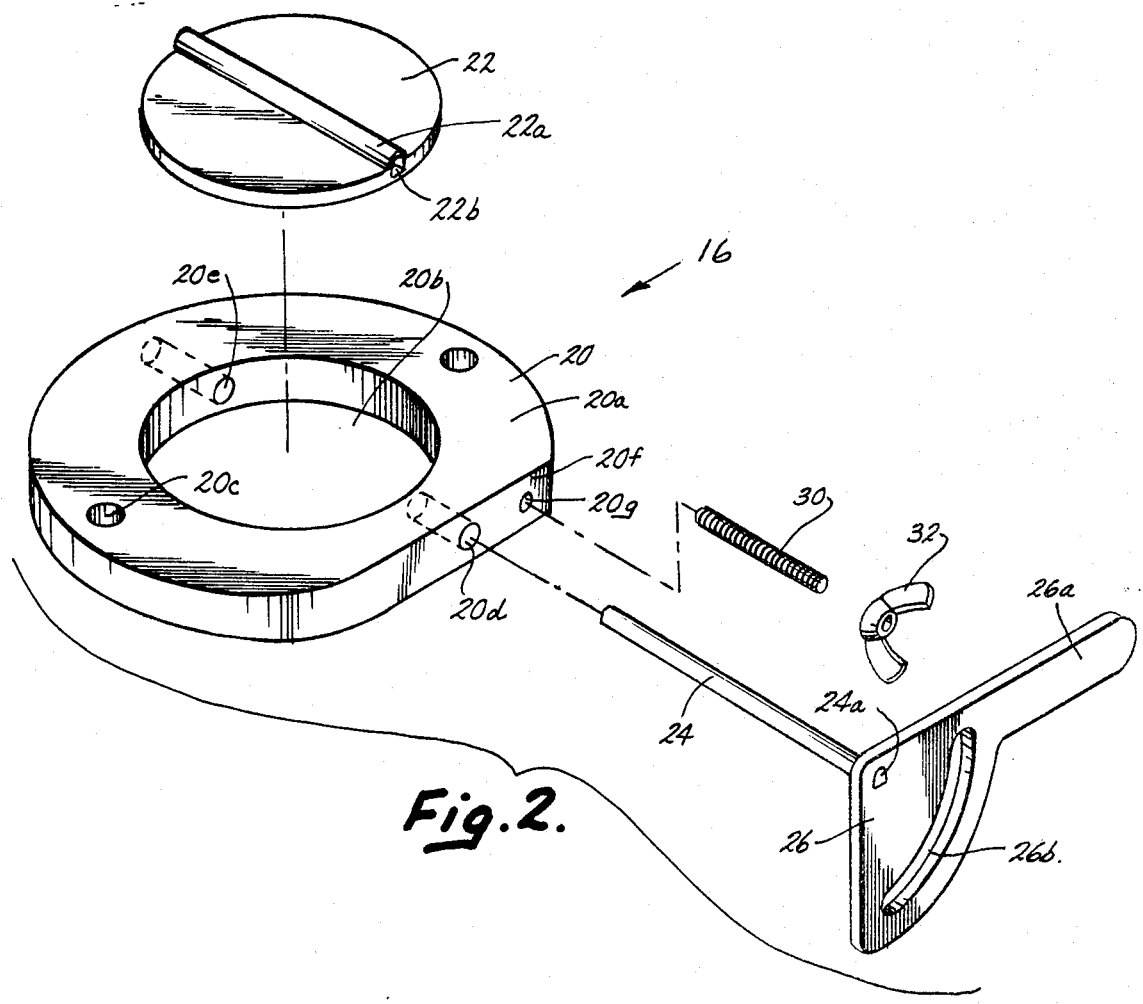
FIG. 2 is a perspective exploded view of the novel wafer damper assembly.

The novel wafer damper assembly 16 is made up of the components depicted in FIG. 2, namely a thin polymeric annulus 20 having a pair of opposite axial faces 20a, a central opening 20b, preferably two or more bolt holes 20c extending between the faces, a pair of axially aligned, transverse, radially oriented, cylindrical passages 20d and 20e, at least one of which, 20d, extends clear through the periphery of the annulus, a flat, generally tangential bearing surface 20f on the periphery of the annulus adjacent the outer end of passage 20d, and a threaded recess 20g in surface 20f and laterally offset from axial passage 20d. Aligned passages 20d and 20e are on the centerline of opening 20b which is pivot axis bisecting opening 20b.

Fitted within opening 20b of this annulus, and having a peripheral dimension and shape matching that of opening 20b, is a pivotal polymeric wafer damper 22. Formed integral with this damper is a transverse tunnel 22a defining an internal transverse passage 22b of non-circular cross sectional configuration, e.g. flat on one side. This passage aligns with passages 20d and 20e in the annulus, with all three receiving a transverse shaft 24 at least the central portions of which are also of non-circular cross sectional configuration interfitting with that of the passage in tunnel 22a. The ends of shaft 24 are pivotal in passages 20d and 20e for rotation therein. Shaft 24 has one end 24a extending through passage 20d in the annulus to interconnect with a quadrant handle 26 on the flat bearing surface 20f. This handle projects normal to the axis of shaft 24 and includes a manual gripping handle portion 26a. The quadrant handle also includes an arcuate slot 26b having a center of curvature on the pivot axis of shaft 24 and spaced from the pivot axis a distance equal to that between threaded recess 20g and passage 20d. Threadably engaged into recess 20g is a threaded stud 30 for protrusion through slot 26b when the unit is assembled. A tightenable wing nut 32 or other suitable fastener is attached to the outer end of stud 30 to allow handle 26 to be secured in any particular selected position.

Assembly of the wafer damper unit is readily achieved by positioning wafer 22 in opening 20b, inserting shaft 24 through passages 20d, 22b and 20e, the stud 30 being inserted into recess 20g and wing nut 32 being attached to the outer end of the stud.

Assembly of this novel wafer damper unit into a duct or pipeline is achieved simply by disconnecting the two conventional flange connectors 14 and 14' or the equivalent, spreading them slightly apart, sliding the thin wafer damper assembly therebetween, and refastening the bolts or equivalent to achieve the total assembly depicted in FIG. 1. Flow through the duct or pipe is controlled by pivoting the handle 26 to the desired position and thereby pivoting wafer 22 a like amount, and securing the unit with wing nut 32 or the equivalent. Disassembly of the apparatus is just as readily achieved if desired.

The embodiments of the invention in which an exclusive property or privilege is claimed are defined as follows:

1. A wafer damper assembly comprising a thin, flat, polymeric annulus having a central opening, and having a pair of opposite axial abutment faces for abutting duct ends; a polymeric wafer baffle in said central opening peripherally configurated to match said central opening, and having a transverse passage across the center of said baffle, said passage having a non-circular cross section; a shaft extending through said passage and into said annulus at the ends of said shaft, with one end of said shaft extending through said flat annulus, said shaft having a non-circular cross section whereby pivoting of said shaft relative to said flat annulus also pivots said wafer; a quadrant handle secured to said extended shaft end and extending transversely thereto for pivoting of said shaft, said handle including an arcuate lock slot having a center of curvature at said shaft; and releasable handle-securing fastener extending from said flat annulus through said lock slot for securing said handle in selected position.

2. The wafer damper assembly in claim 1 wherein said flat annulus includes a peripheral bearing surface for said quadrant handle, said releasable fastener also being at said bearing surface.

* * * * *